United States Patent
Lee et al.

(10) Patent No.: US 9,237,488 B2
(45) Date of Patent: Jan. 12, 2016

(54) APPARATUS AND METHOD FOR PROCESSING HANDOVER IN A WIRELESS COMMUNICATION SYSTEM

(75) Inventors: Kang-Gyu Lee, Yongin-si (KR);
Jeong-Hoon Park, Suwon-si (KR);
Eun-Jung An, Suwon-si (KR);
Young-Sam Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1228 days.

(21) Appl. No.: 12/252,777

(22) Filed: Oct. 16, 2008

(65) Prior Publication Data

US 2009/0104910 A1    Apr. 23, 2009

(30) Foreign Application Priority Data

Oct. 17, 2007    (KR) .................... 10-2007-0104316

(51) Int. Cl.
*H04W 36/00*    (2009.01)
*H04W 76/02*    (2009.01)

(52) U.S. Cl.
CPC .......... *H04W 36/0055* (2013.01); *H04W 76/02* (2013.01)

(58) Field of Classification Search
CPC ............................ H04W 76/028; H04W 36/12
USPC ......... 370/331, 338, 328, 329; 455/343.2, 39, 455/436, 73, 440, 442, 458, 437, 434; 379/58
See application file for complete search history.

(56) References Cited

U.S. PATENT DOCUMENTS

| | | | | |
|---|---|---|---|---|
| 5,544,224 | A | * | 8/1996 | Jonsson et al. ............... 455/434 |
| 6,879,830 | B1 | * | 4/2005 | Vollmer et al. ............... 455/442 |
| 7,920,510 | B2 | * | 4/2011 | Kim ............................. 370/328 |
| 2005/0101326 | A1 | * | 5/2005 | Kang et al. .................... 455/436 |
| 2005/0272481 | A1 | | 12/2005 | Kim |
| 2006/0215609 | A1 | * | 9/2006 | Kyung et al. ................. 370/331 |
| 2007/0160017 | A1 | * | 7/2007 | Meier et al. .................. 370/338 |
| 2007/0249291 | A1 | * | 10/2007 | Nanda et al. .................... 455/73 |
| 2007/0253372 | A1 | * | 11/2007 | Nakayasu ..................... 370/331 |
| 2008/0049674 | A1 | * | 2/2008 | Cha et al. ...................... 370/331 |

FOREIGN PATENT DOCUMENTS

| KR | 10-2005-0078627 A | 8/2005 |
|---|---|---|
| KR | 10-2007-0098385 A | 10/2007 |

* cited by examiner

*Primary Examiner* — Kiet Doan
(74) *Attorney, Agent, or Firm* — Jefferson IP Law, LLP

(57) ABSTRACT

An apparatus and method for processing handover in a wireless communication system are provided. The method includes selecting a cell for handover when a HandOver (HO) drop occurs, identifying if information for communicating with a serving BS is stored, transmitting a message ranging request signal to the serving BS, identifying provision or non-provision of a service from the serving BS comprised in a response signal to the message ranging request signal, and transmitting/receiving a signal with the serving BS.

16 Claims, 8 Drawing Sheets

APPARATUS AND METHOD FOR PROCESSING HANDOVER IN A WIRELESS COMMUNICATION SYSTEM

PRIORITY

This application claims the benefit under 35 U.S.C. §119 (a) of a Korean patent application filed in the Korean Intellectual Property Office on Oct. 17, 2007 and assigned Serial No. 2007-104316, the entire disclosure of which is hereby incorporated by reference.

BACKGROUND OF THE INVENTION

1. Field of the Invention

The present invention relates to an apparatus and method for supporting the mobility of a Mobile Station (MS) in a wireless communication system. More particularly, the present invention relates to a handover apparatus and method for maintaining the maximum Quality of Service (QoS) of an MS in a wireless communication system.

2. Description of the Related Art

Wireless communication systems use a handover technology such that Mobile Stations (MSs) can move between cells while maintaining communication. According to the Institute of Electrical and Electronics Engineers (IEEE) 802.16-2004 COR2_D3 standard, there are three basic modes of handover: 1) hard HandOver (HO), 2) Macro Diversity HandOver (MDHO), and 3) Fast Base Station Switching (FBSS). Wireless communication systems adopt a hard HO mode as an Inter Operability Test (IOT) between an MS and BS manufacturer and a service provider due to the stability of technology application and the ease of technology realization.

A hard HO technology is divided into an MS-initiated HO technology and a BS-initiated HO technology. Comparing the MS-initiated HO technology and the BS-initiated HO technology, an HO process performed between an MS and a serving BS has few differences, and an HO entry process performed between an MS and a target BS is substantially identical.

When performing handover, an MS selects a target BS for handover through an HO process with a serving BS. After that, the MS acquires synchronization with the target BS and performs an HO entry process.

The MS may fail to complete the HO entry with the target BS process because of a channel environment, thus causing the occurrence of an HO drop. A wireless communication system can process the HO drop as described below with reference to FIG. 1.

FIG. 1 illustrates a method of processing an HO drop in a wireless communication system according to the conventional art. The following description is made assuming that the wireless communication system uses an MS-initiated HO technology.

Referring to FIG. 1, an MS 100 receives a service from a serving BS 110. That is, the MS 100 transmits/receives traffic with the serving BS 110 in step 131.

The MS 100 measures signal strength of the serving BS 110 and neighboring BSs, determining whether to perform handover in step 133. If the MS 100 determines to perform handover, the MS 100 transmits an HO request signal (MOB_MSHO-REQ) to the serving BS 110 in step 135. The HO request signal includes information on the neighboring BSs to which the MS 100 can perform handover.

The serving BS 110 identifies the information on the neighboring BSs included in the HO request signal, thus identifying if the neighboring BSs can support handover of the MS 100. Then, the serving BS 110 transmits an HO response signal (MOB_BSHO-RSP) to the MS 100 in step 137. The HO response signal includes information on neighboring BSs constructed such that the neighboring BS that can best support the handover of the MS 100 is listed first.

The MS 100 selects a target BS 120 for handover using the HO response signal that includes information on whether neighboring BSs support the handover of the MS 100. Then, the MS 100 transmits an HO indication signal (MOB_MS-IND) to the serving BS 110 so as to inform of HO initiation in step 139. At this time, the MS 100 drives a resource maintenance timer for releasing information on the serving BS 110. If the resource maintenance timer expires, the MS 100 releases the information on the serving BS 110. The information on the serving BS 110 includes a frequency of the serving BS 110, a preamble index, a serving BS 110 IDentifier (ID) and service related context information.

After transmitting the HO indication signal, the MS 100 acquires downlink synchronization with the target BS 120 in step 141.

If the HO indication signal is received, the serving BS 110 drives a resource maintenance timer for releasing information on the MS 100 in step 143. If the resource maintenance timer expires, the serving BS 110 releases the information on the MS 100.

Then, the MS 100 exchanges a signal for HO entry with the target BS 120 in step 145. If the MS 100 acquires Connection ID (CID) information and authentication information through a ranging response signal (RNG-RSP) received from the target BS 120, the MS 100 completes HO entry with the target BS 120.

However, if an HO ranging attempt is repeatedly made more than a threshold number of times due to channel degradation during the HO entry, the MS 100 recognizes that an HO drop occurs in step 147.

When the HO drop occurs, the MS 100 reselects a BS for handover in step 149. Although not shown, when the reselected BS is not the serving BS 110, the MS 100 performs HO entry to the reselected BS.

When the reselected BS is the serving BS 110, the MS 100 identifies if the resource maintenance timer driven to release the information on the serving BS 110 has expired in step 151.

If the resource maintenance timer has not expired, the MS 100 can be aware of information for communication with the serving BS 110 and thus, transmit an HO indication signal to the serving BS 110 to return to service with the serving BS 110 in step 153. That is, the MS 100 transmits an HO indication signal of a type different from the previous HO indication signal, which has been transmitted to the serving BS 110 in step 139, to the serving BS 110. Then, the MS 100 recognizes that it returns to the serving BS 110, thus operating in a mode for transmitting/receiving traffic with the serving BS 110 in step 157.

However, the serving BS 110 may fail to receive the HO indication signal from the MS 100 that was transmitted in step 153 due to channel degradation between the MS 100 and the serving BS 110 in step 155.

At this time, the serving BS 110 fails to recognize that the MS 100 desires to enter the serving BS 110. Thus, the serving BS 110 identifies if a resource maintenance timer driven to release information on the MS 100 expires in step 159.

If the resource maintenance timer expires, the serving BS 110 releases the information on the MS 100 in step 161. That is, because the serving BS 110 fails to receive the HO indication signal, it erroneously assumes that the MS 100 performs handover to a different BS. However, the MS 100 transmits the HO indication signal, thus erroneously indicating that it performs communication with the serving BS 110. Thus, a problem of inconsistency of communication states of the MS 100 and the serving BS 110 takes place.

As described above, when the communication states of the MS 100 and the serving BS 110 are inconsistent with each other, the MS 100 transmits a signal but the serving BS 110 fails to receive the signal from the MS 100, thus causing a problem of communication interruption.

Also, when the serving BS 110 deletes information on the MS 100, the serving BS 110 can allocate a CID, which had previously been allocated to the MS 100, to a different MS. At this time, the MS 100 can receive a downlink signal including the allocated CID from the serving BS 110 and send a signal to the serving BS 110 in response to the downlink signal. In this case, a problem may occur in that the response signal from the MS 100 interrupts a communication between the different MS, to which the serving BS 110 now allocates the CID, and the serving BS 110.

SUMMARY OF THE INVENTION

An aspect of the present invention is to address at least the above-mentioned problems and/or disadvantages and to provide at least the advantages below. Accordingly, an aspect of the present invention is to provide an apparatus and method for preventing an inconsistency of a communication state between a Mobile Station (MS) and a serving Base Station (BS) when the MS returns to the former serving BS due to occurrence of a HandOver (HO) drop in a wireless communication system.

Another aspect of the present invention is to provide an apparatus and method for allowing a serving BS to transmit a signal in response to a return request signal of an MS, thus preventing an inconsistency of a communication state between the MS and the serving BS, when the MS returns to the former serving BS due to occurrence of an HO drop in a wireless communication system.

Yet another aspect of the present invention is to provide an apparatus and method for allowing an MS to perform an HO entry process with a serving BS, thus preventing an inconsistency of a communication state between the MS and the serving BS, when the MS returns to the former serving BS due to occurrence of an HO drop in a wireless communication system.

The above aspects are achieved by providing an apparatus and method for processing handover in a wireless communication system.

According to one aspect of the present invention, a method for handover of a Mobile Station (MS) in a wireless communication system is provided. The method includes selecting a Base Station (BS) for handover when a HandOver (HO) drop occurs, identifying if information for communicating with the serving BS is stored when the selected BS is a serving BS having previously provided a service before handover initiation, performing code ranging with the serving BS when the information for communicating with the serving BS is stored, transmitting a message ranging request signal to the serving BS, identifying provision or non-provision of a service from the serving BS comprised in a response signal to the message ranging request signal when the response signal is received, and communicating with the serving BS when the serving BS provides a service.

According to another aspect of the present invention, a method for controlling handover of a Mobile Station (MS) in a Base Station (BS) of a wireless communication system is provided. The method includes, when a message ranging request signal is received from an MS, comparing a BS IDentifier (ID) contained in the message ranging request signal with an ID of the BS, when the BS ID contained in the message ranging request signal is equal to the ID of the BS, identifying if information for communicating with the MS is stored, and when the information for communicating with the MS is stored, informing the MS that service can be resumed.

According to a further another aspect of the present invention, a Mobile Station (MS) apparatus of a wireless communication system is provided. The apparatus includes a cell selector, a storage unit, a handover controller, a transmitter, and a receiver. The cell selector selects a Base Station (BS) to which an MS hands over. The storage unit stores information for communicating with a BS performing communication and, if a resource storage maintenance time lapses after handover initiation, deletes the information for communicating with the BS. When the BS selected by the cell selector due to occurrence of a HandOver (HO) drop is a serving BS having previously provided a service before handover initiation, the handover controller controls to resume service with the serving BS depending on whether the information for communicating with the serving BS is deleted from the storage unit. The transmitter transmits a signal for requesting to resume service with the serving BS under control of the handover controller. The receiver receives a response signal to a signal transmitted through the transmitter from the serving BS.

According to a yet another aspect of the present invention, an apparatus for controlling handover of a Mobile Station (MS) in a serving Base Station (BS) of a wireless communicating system is provided. The apparatus includes a receiver, a handover controller, and a transmitter. The receiver receives a signal. When a BS IDentifier (ID) of a message ranging request signal received from an MS through the receiver is equal to an identifier of the BS and information for communicating with the MS is stored, the handover controller controls and resumes a service to the MS. The transmitter informs the MS of the resuming of the service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A technology for preventing an inconsistency in a communication state between a Mobile Station (MS) and a serving Base Station (BS) when an MS returns to the serving BS due to occurrence of a HandOver (HO) drop in a wireless communication system according to exemplary embodiments of the present invention is described below.

A hard HO technology based on an MS-initiated HO mode in a wireless communication system is described below. However, it is to be understood that this is for example purposes only and that the present invention is also applicable to other HO modes.

Figure 1:
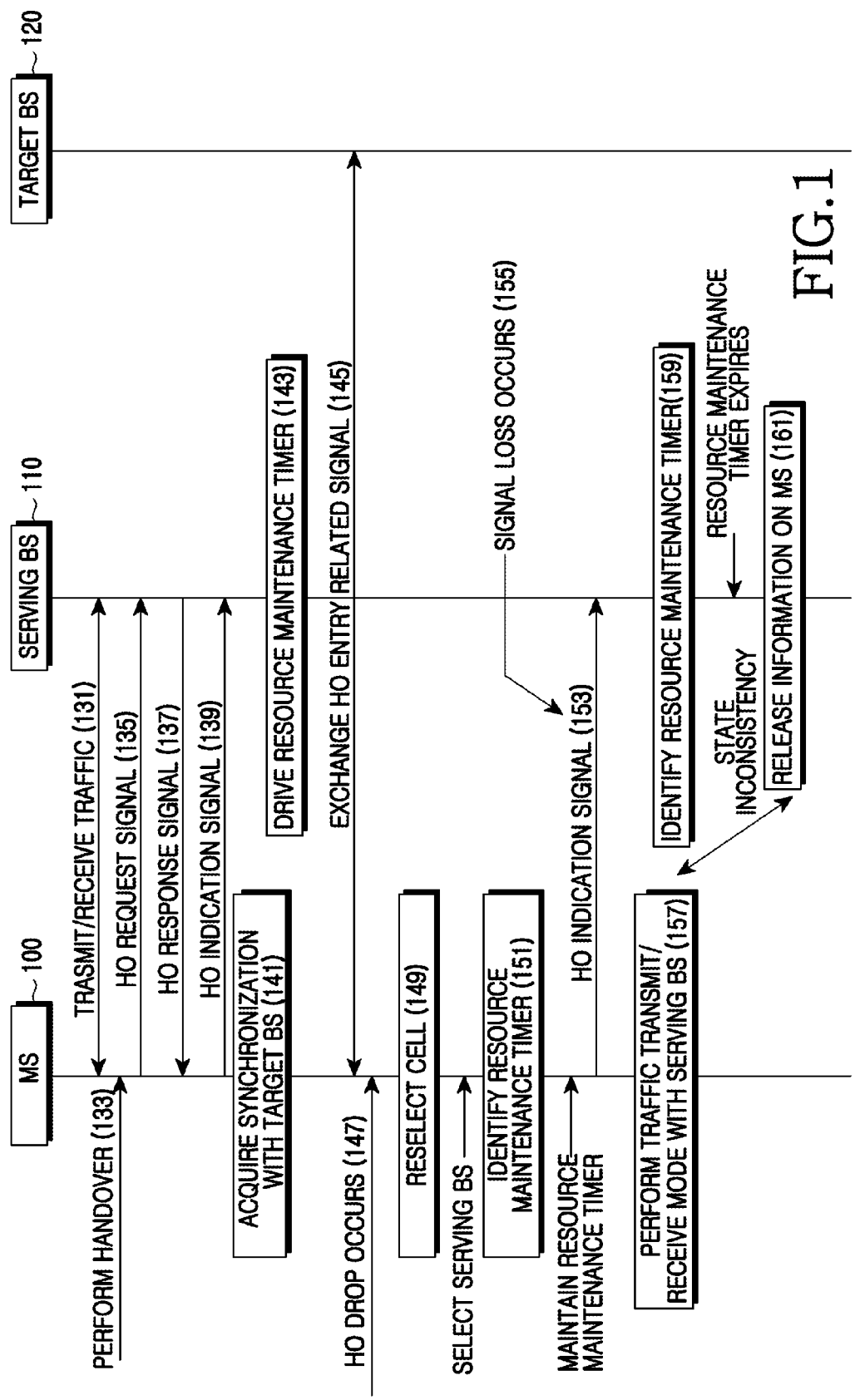
FIG. 1 is a ladder diagram illustrating a method of processing a HandOver (HO) drop in a wireless communication system according to the conventional art.
Figure 2:
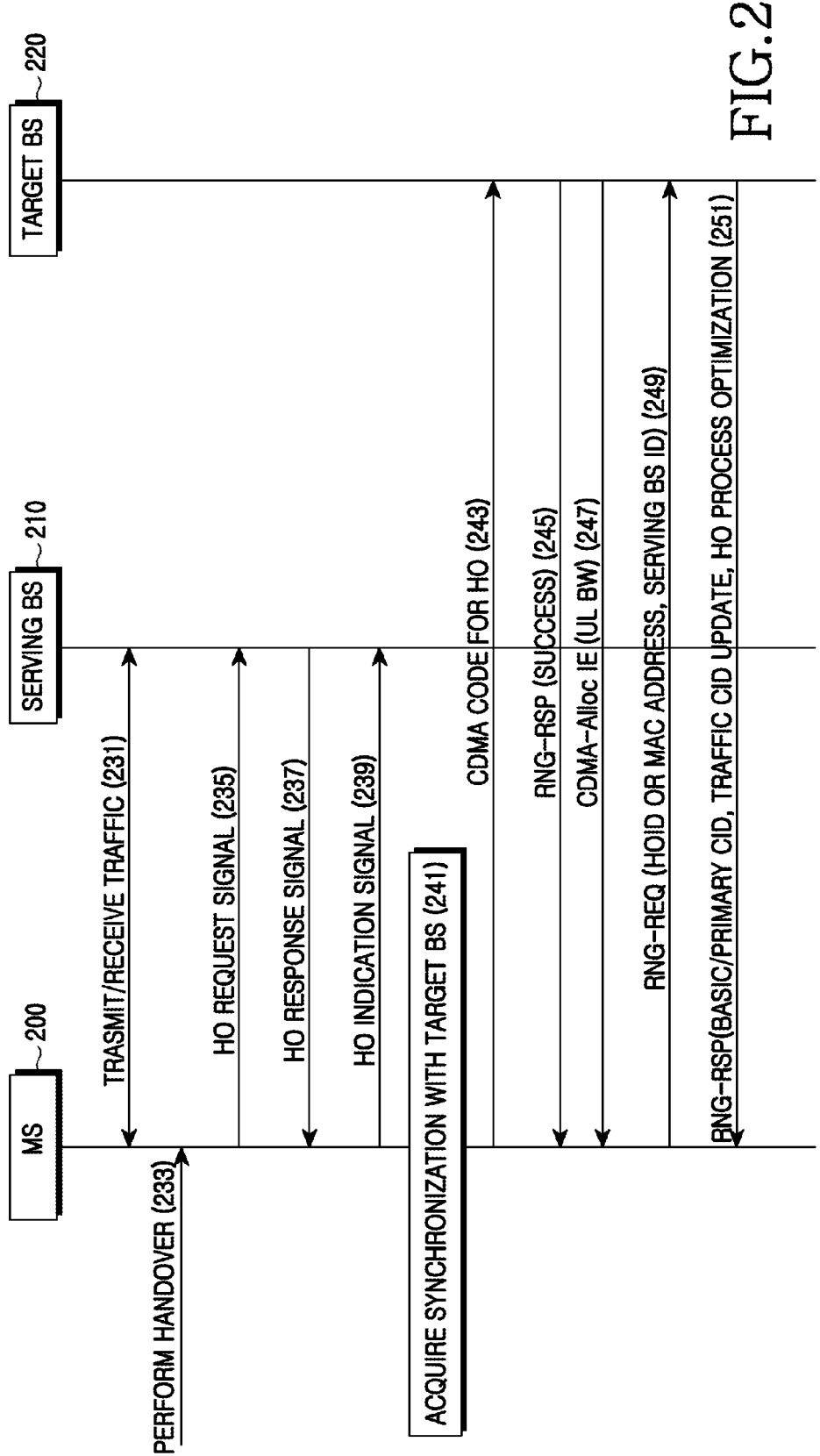
FIG. 2 is a ladder diagram illustrating a process of handover in a wireless communication system according to an exemplary embodiment of the present invention.

An exemplary wireless communication system performs MS-initiated HO as shown in FIG. 2 below.

FIG. 2 is a ladder diagram illustrating a process of handover in a wireless communication system according to an exemplary embodiment of the present invention.

Referring to FIG. 2, an MS 200 receives a service from a serving BS 210. That is, the MS 200 transmits/receives traffic to/from the serving BS 210 in step 231.

The MS 200 measures signal strength of the serving BS 210 and neighboring BSs, determining whether to perform handover in step 233.

If the MS 200 determines to perform handover, the MS 200 transmits an HO request signal (MOB_MSHO-REQ) to the serving BS 210 in step 235. The HO request signal includes information on neighboring BSs to which the MS 200 can perform handover.

The serving BS 210 identifies the information on the neighboring BSs included in the HO request signal, and determines if the neighboring BSs can support handover of the MS 200. Then, the serving BS 210 transmits an HO response signal (MOB_BSHO-RSP) to the MS 200 in step 237. The HO response signal includes information on neighboring BSs constructed in order of neighboring BS best able to support the handover of the MS 200.

The MS 200 selects a target BS 220 for handover using the HO response signal that includes information on whether the neighboring BSs can support the handover. Then, the MS 200 transmits an HO indication signal (MOB_MS-IND) to the serving BS 210 so as to inform of HO initiation to the target BS 220 in step 239. Here, the MS 200 may set a type of the HO indication signal to represent that the HO indication signal indicates handover to the target BS 220.

Also, the MS 200 drives a resource maintenance timer for releasing information on the serving BS 210. If the resource maintenance timer expires, the MS 200 releases the information on the serving BS 210. The information on the serving BS 210 may include a frequency of the serving BS 210, a preamble index, a serving BS 210 IDentifier (ID), service related context information and the like.

If the HO indication signal is received, the serving BS 210 drives a resource maintenance timer for releasing information on the MS 200. If the resource maintenance timer expires, the serving BS 210 releases the information on the MS 200.

After transmitting the HO indication signal, the MS 200 acquires downlink synchronization with the target BS 220 in step 241.

Then, the MS 200 transmits a Code Division Multiple Access (CDMA) code for handover to the target BS 220 for HO entry to the target BS 220 in step 243.

If the CDMA code for handover is received, the target BS 220 transmits a code ranging response signal (RNG-RSP) including information such as a timing offset and a frequency offset to the MS 200, depending on its own uplink basis, in step 245.

The target BS 220 transmits CDMA allocation Information Element (IE) (CDMA-Alloc IE) information to the MS 200 in step 247. The CDMA allocation IE information may include ranging code attribute information of a CDMA code index received by the BS, a frame number where a CDMA code is received, a position of an OFDM time symbol where the received CDMA code is located, OFDMA subchannel index information having a modulation of the CDMA code, etc., and uplink resource allocation information.

The MS 200 acquires synchronization with the target BS 220 through the code ranging response signal received from the target BS 220.

The MS 200 is allocated uplink resources through the CDMA allocation IE received from the target BS 220. For instance, if the CDMA allocation IE is received, the MS 200 compares the ranging code attribute information included in the CDMA allocation IE with ranging attribute information on the CDMA code that is transmitted to the target BS 220 in step 243. If the ranging code attribute information is equal to the ranging attribute information, the MS 200 recognizes that uplink resource allocation information included in the CDMA allocation IE is an IE allocated to the MS 200.

Then, the MS 200 transmits a message ranging request signal (RNG-REQ) to perform message ranging with the target BS 220 in step 249. The message ranging request signal includes a Media Access Control (MAC) address of the MS 200.

If the message ranging request signal is received from the MS 200, the target BS 220 transmits a message ranging response signal (RNG-RSP) including a MAC address of the MS 200 to the MS 200 in step 251. The message ranging response signal includes a MAC protocol parameter allocated to the MS 200 in the target BS 220. For instance, the MAC protocol parameter may include a basic CID, a primary CID, a traffic CID, authentication information and the like.

That is, the MS 200 acquires initial network entry to the target BS 220, position registration, and a parameter related to MAC protocol synchronization for handover through the message ranging. Then, the MS 200 registers the target BS 220 as a new serving BS.

As described above, an MS performs handover to a target BS through an HO entry process with the target BS in the wireless communication system. However, an HO drop may occur due to a channel environment, etc. during the HO entry process, resulting in a failure of completion of the HO entry process.

Figure 3:
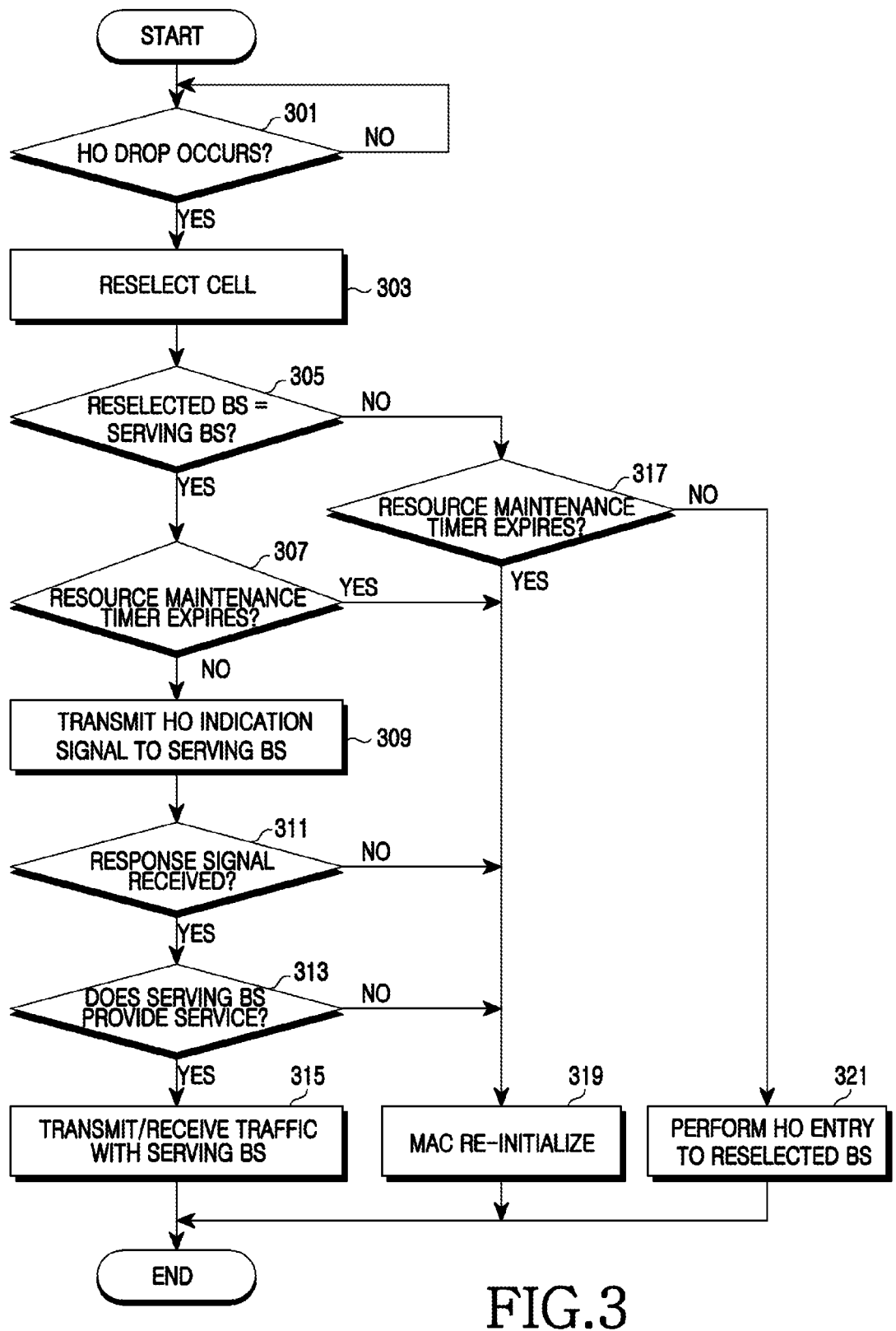
FIG. 3 is a flow diagram illustrating an operation process of a Mobile Station (MS) for processing an HO drop in a wireless communication system according to an exemplary embodiment of the present invention.

When an HO drop takes place upon handover in the wireless communication system, an MS may operate according to an exemplary embodiment of the present invention as shown in FIG. 3 below.

Alternatively, if the resource maintenance timer does not expire, in step 309 the MS transmits to the serving BS an HO indication signal for returning to the serving BS based on known information of the serving BS. The information on the serving BS may include a frequency of the serving BS, a preamble index, a serving BS ID, service related context information and the like. The MS sets a type (HO_IND_type) of the HO indication signal as '0b11' as shown in Table 1 below in order to represent that the HO indication signal is a signal for returning to the serving BS.

TABLE 1

| Syntax | Size | Notes |
|---|---|---|
| Management message type = 59 | 8 bits | |
| Reserved | 6 bits | Shall be to zero |
| Mode | 2 bits | 0b00: HO |
| | | 0b01: MDHO/FBSS: Anchor BS update |
| | | 0b10: MDHO/FBSS: Diversity set update |
| If (Mode == 0b00){ | | |
|   HO_IND_type | 2 bits | 0b00: Serving BS release |
| | | 0b01: HO cancel |
| | | 0b10: HO reject |
| | | 0b11: HO drop and returning to serving BS |
|   Ranging Parameters valid indication | 2 bits | 0b00: No indication (default) |
|   reserved | 4 bits | |
|   If (HO_IND_type == 0b00){ | | |
|     Target BSID | 48 bits | |
|     Preamble index | 8 bits | |
|   } | 8 bits | |
|   else If (HO_IND_type == 0b11){ | | |
|     MS MAC address | 48 bits | MS MAC address which is trying to resume service with serving BS |
|   } | | |
| } | | |
| TLV encoded information | variable | |

FIG. 3 is a flow diagram illustrating an operation process of an MS for processing an HO drop in a wireless communication system according to an exemplary embodiment of the present invention.

Referring to FIG. 3, in step 301, an MS identifies if an HO drop occurs during HO entry to a target BS. That is, if for example channel interference increases or distances between the MS and BSs increase near a boundary between a serving BS and the target BS at which handover of the MS is to take place, thus causing a poor signal quality, the HO to the target BS may fail such that the HO is dropped. Accordingly, the MS and the target BS fail to normally transmit/receive a signal during HO entry, thus resulting in occurrence of an HO drop. If the number of times of HO ranging exceeds a threshold number, the MS recognizes that an HO drop occurs.

If the HO drop occurs, the MS reselects a cell for handover in step 303. That is, the MS again selects a BS for handover. Alternatively, if the HO drop does not occur, the MS repeatedly performs step 301.

After reselecting a BS for handover, the MS identifies if the reselected BS is the former serving BS in step 305.

If the reselected BS is equal to the former serving BS, the MS determines if a resource maintenance timer driven to release a resource of the serving BS has expired in step 307. In an exemplary implementation, the MS may drive the resource maintenance timer when transmitting an HO indication signal to the serving BS as in step 239 of FIG. 2.

If the resource maintenance timer expires, the MS performs MAC re-initialize to the serving BS in step 319.

In Table 1, when the MS transmits to a serving BS an HO indication signal for handover to a target BS, the MS sets a type (HO_IND_type) of the HO indication signal as '0b00'. Also, when the MS transmits to a serving BS an HO indication signal for returning to the serving BS, the MS sets a type (HO_IND_type) of the HO indication signal as '0b11'.

After transmitting an HO indication signal in step 309, the MS identifies if a response signal to the HO indication signal is received from the serving BS during a certain time in step 311. For example, the response signal is constructed as in Table 2 below.

TABLE 2

| Syntax | Size | Notes |
|---|---|---|
| Management message type = xx | 8 bits | |
| Service continuity | 8 bits | 0: No service |
| | | 1: Service resume |
| MS MAC address | 48 bits | MS MAC address |

In Table 2, the MS identifies an MS MAC address field of the response signal, thus identifying if the response signal is transmitted to the MS from the serving BS. Also, the MS identifies a service continuity field, thus identifying if it returns for service to the serving BS.

If a response signal to an HO indication signal is not received from the serving BS within a threshold time, the MS recognizes that the serving BS fails to receive the HO indication signal and thus, in step 319, performs MAC re-initialize to the serving BS.

If a response signal to an HO indication signal is received from the serving BS within the threshold time, in step 313 the MS identifies if it returns for service to the serving BS in the response signal. That is, the MS identifies if it returns for service to the serving BS through the service continuity field of Table 2 in the response signal.

If the service continuity field of the response signal is equal to 'Service resume', in step 315 the MS returns to the serving BS, transmitting/receiving traffic with the serving BS.

Alternatively, if the service continuity field of the response signal is equal to 'No service', in step 319 the MS performs MAC re-initialize to the serving BS.

Referring again to step 305, if it is determined that the reselected BS is not the serving BS, the MS identifies if a resource maintenance timer driven to release a resource of the serving BS expires in step 317. In an exemplary implementation, the MS drives the resource maintenance timer when transmitting an HO indication signal to the serving BS as in step 239 of FIG. 2.

If the resource maintenance timer expires, the MS performs MAC re-initialize to the selected BS in step 319.

If the resource maintenance timer does not expire, the MS performs HO entry to the selected BS in step 321. That is, if the resource maintenance timer does not expire, the MS recognizes that the serving BS includes information for performing communication with the MS. Accordingly, the serving BS can provide information on the MS to the selected BS and thus, the MS can perform HO entry to the selected BS.

Then, the MS terminates the process according to an exemplary embodiment of the present invention.

When an HO drop occurs in the wireless communication system as above, a serving BS according to an exemplary embodiment of the present invention may operate as in FIG. 4 below.

Figure 4:
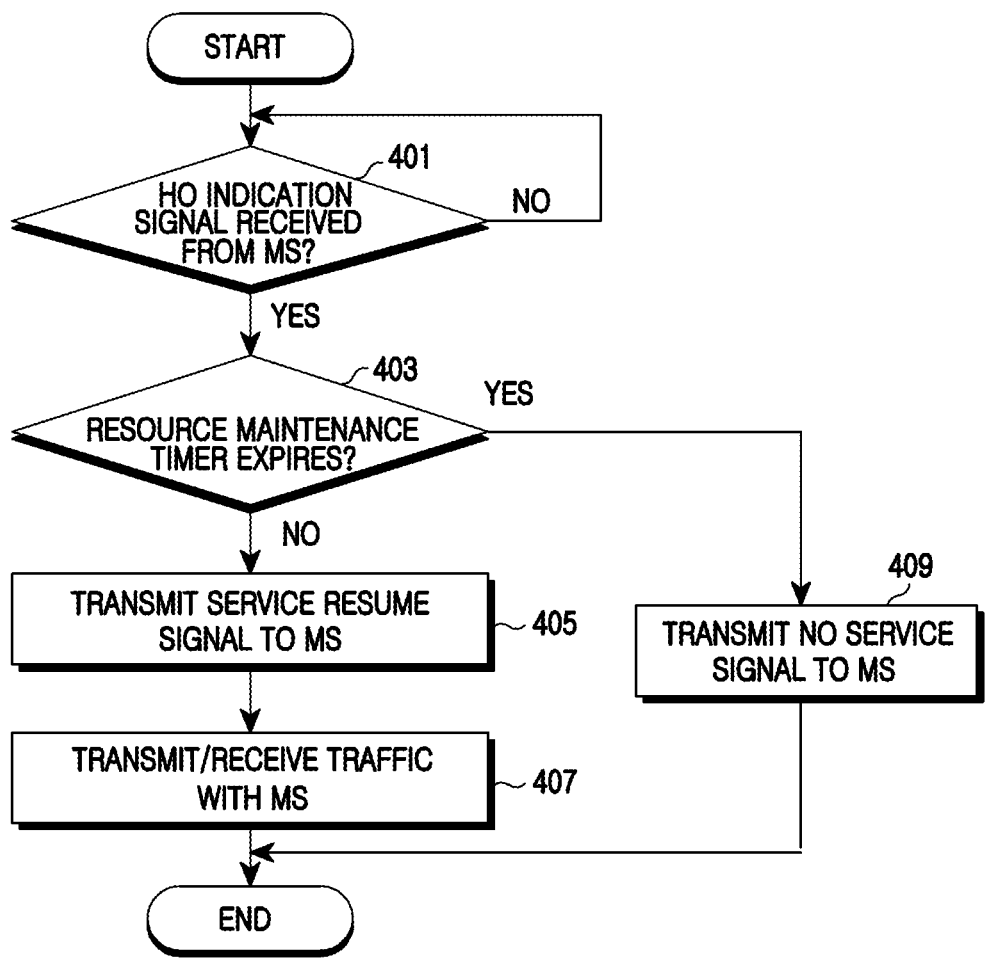
FIG. 4 is a flow diagram illustrating an operation process of a Base Station (BS) for processing an HO drop in a wireless communication system according to an exemplary embodiment of the present invention.

FIG. 4 is a flow diagram illustrating an operation process of a BS for processing an HO drop in a wireless communication system according to an exemplary embodiment of the present invention.

Referring to FIG. 4, in step 401, a BS identifies if it receives an HO indication signal for service from an MS, which has previously been provided with a service, before performing handover to a target BS. In an exemplary embodiment, the BS identifies if it receives an HO indication signal whose signal type (MOB_IND_type) is set as '0b11'.

If an HO indication signal for an MS to return for service is received, the BS identifies if a resource maintenance timer for releasing information on the MS transmitting the HO indication signal expires in step 403. In an exemplary implementation, the resource maintenance timer is driven to release the information on the MS if the HO indication signal for handover to the target BS is received from the MS as in step 239 of FIG. 2. At this time, the BS identifies a corresponding MS through an MS MAC address included in the HO indication signal.

If the resource maintenance timer does not expire, the BS determines that it can perform communication with the MS using previously stored information on the MS in step 405. Accordingly, the BS transmits a service resume signal to the MS. That is, the BS sets a service continuity field of a response signal constructed as in Table 2 by '1' and transmits the response signal to the MS.

Then, in step 407, the BS transmits/receives traffic to the MS.

Alternatively, if the resource maintenance timer does expire in step 403, the BS determines that it cannot perform communication with the MS because information for performing communication with the MS is deleted. Thus, the BS transmits a no service signal to the MS in step 409. That is, the BS sets a service continuity field of a response signal constructed as in Table 2 by '0' and transmits the response signal to the MS.

Then, the BS terminates the process according to an exemplary embodiment of the present invention.

Figure 5:
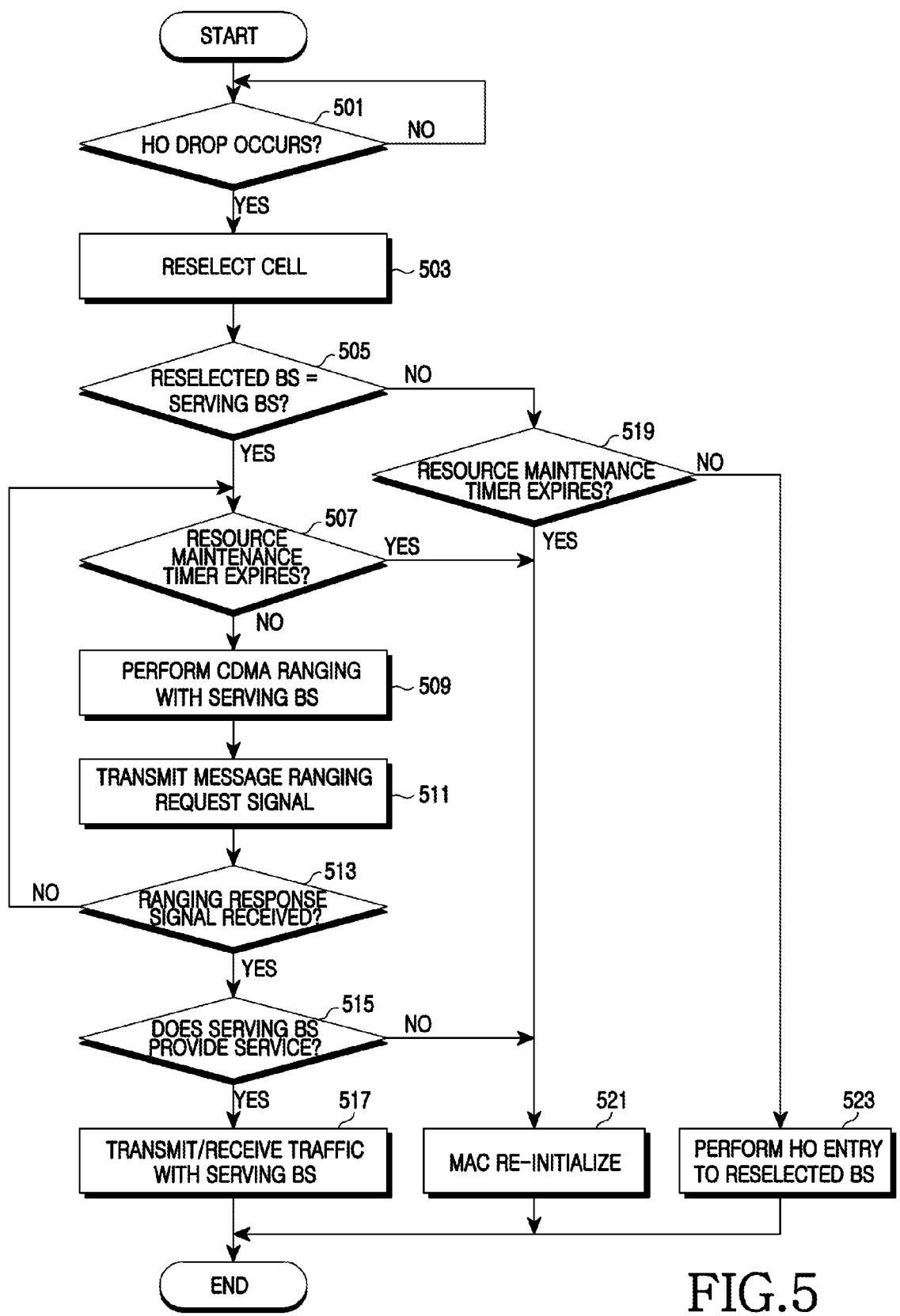
FIG. 5 is a flow diagram illustrating an operation process of an MS for processing an HO drop in a wireless communication system according to another exemplary embodiment of the present invention.

When an HO drop occurs upon handover in the wireless communication system, an MS according to another exemplary embodiment of the present invention can also operate as shown in FIG. 5 below.

FIG. 5 is a flow diagram illustrating an operation process of an MS for processing an HO drop in a wireless communication system according to another exemplary embodiment of the present invention.

Referring to FIG. 5, in step 501, an MS identifies if an HO drop occurs during HO entry to a target BS. That is, if for example channel interference increases or distances between the MS and BSs increase near a boundary between a serving BS and the target BS at which handover of the MS is to take place, thus causing a poor signal quality, the HO to the target BS mail fail such that the HO is dropped. Accordingly, the MS and the target BS fail to normally transmit/receive a signal during HO entry, thus resulting in occurrence of an HO drop. If the number of times of HO ranging exceeds a threshold number, the MS recognizes that an HO drop occurs.

If the HO drop occurs, the MS reselects a cell for handover in step 503. That is, the MS again selects a BS for handover. If the HO drop does not occur, the MS repeatedly performs step 501.

After reselecting the BS for handover, the MS identifies if the reselected BS is the former serving BS in step 505.

If the reselected BS is the former serving BS, the MS determines if a resource maintenance timer driven to release a resource of the serving BS expires in step 507. In an exemplary implementation, the MS drives the resource maintenance timer when transmitting an HO indication signal to the serving BS as in step 239 of FIG. 2.

If the resource maintenance timer expires, the MS performs MAC re-initialize to the serving BS in step 521.

Alternatively, if the resource maintenance timer does not expire, in step 509 the MS performs code ranging for HO entry to the serving BS based on known information for communicating with the serving BS. The information for communicating with the serving BS may include a frequency of the serving BS, a preamble index, a serving BS ID, service related context information and the like.

For example, the MS may transmit a CDMA code to the serving BS for code ranging. Then, the MS acquires synchronization with the serving BS through a code ranging response signal received from the serving BS. Also, the MS is allocated uplink resources through a CDMA allocation IE received from the serving BS. For instance, if the CDMA allocation IE is received, the MS compares ranging code attribute information included in the CDMA allocation IE with ranging attribute information on the CDMA code transmitted to the serving BS. If the ranging code attribute information is equal to the ranging attribute information, the MS recognizes that uplink resource allocation information included in the CDMA allocation IE is an IE allocated to the MS itself.

After performing code ranging with the serving BS, in step 511 the MS transmits a message ranging request signal (RNG-REQ) to the serving BS to perform message ranging with the serving BS. At this time, when generating the message ranging request signal, the MS sets a serving BSID Type/Length/Value (TLV) field value as a previously stored serving BSID. The serving BSID TLV can be expressed as in Table 3 below.

TABLE 3

| Name | Type (1 byte) | Length | Value |
|---|---|---|---|
| Serving BSID | 5 | 6 | The unique identifier of the former serving BS. If the ID of BS which receives an RNG-REQ message is equal to the Serving BSID included in that RNG-REQ, the BS shall consider that an MS is trying to re-enter the BS due to HO drop during HO entry |
| Ranging purpose indicator | 6 | 1 | Bit#0: HO indication (when this bit is set to 1 in combination with other included information elements indicates the MS is currently attempting to HO or Network re-entry from idle mode to the BS) Bit#1: Location update request (when this bit is set to 1, it indicates MS action of idle mode location update process |

In Table 3, when an MS returns for service to a former serving BS, the MS sets a serving BSID TLV of a message ranging request signal as a BSID of the serving BS.

In step 513, the MS transmits the message ranging request signal and then determines if it receives a ranging response signal (RNG-RSP) to the message ranging request signal from the serving BS within a threshold time.

If a response signal to a message ranging request signal is not received from the serving BS within the threshold time, the MS returns to step 507.

If a ranging response signal to a message ranging request signal is received from the serving BS during within the threshold time, in step 515 the MS determines a ranging status value included in the ranging response signal. The ranging response signal can include a ranging status value as shown in Table 4.

TABLE 4

| Name | Type (1 byte) | Length | Value |
|---|---|---|---|
| Ranging status | 4 | 1 | Used to indicate whether uplink messages are received within acceptable limits by BS 1 = continue, 2 = abort, 3 = success, 4 = no service resume |

In Table 4, when the ranging status value included in the ranging response signal is equal to '3', the MS recognizes that message ranging with the serving BS succeeds. Also, when the ranging status value included in the ranging response signal is equal to '4', the MS recognizes that the serving BS cannot resume service to the MS.

If the ranging status value of the ranging response signal is equal to 'success', in step 517 the MS returns to the serving BS and transmits/receives traffic with the serving BS.

If the ranging status value of the ranging response signal is equal to 'No service', in step 521 the MS performs MAC re-initialize to the serving BS.

Referring again to step 505, if it is determined that the reselected BS is not equal to the serving BS, the MS determines if a resource maintenance timer driven to release a resource of the serving BS expires in step 519. In an exemplary implementation, the MS drives the resource maintenance timer when transmitting an HO indication signal to the serving BS as in step 239 of FIG. 2.

If the resource maintenance timer expires, in step 521 the MS performs MAC re-initialize to the selected BS.

If the resource maintenance timer does not expire, in step 523 the MS performs HO entry to the selected BS. That is, if the resource maintenance timer does not expire, the MS recognizes that the serving BS still includes information for performing communication with the MS. Accordingly, the serving BS can provide the information on the MS to the selected BS and thus, the MS can perform HO entry to the selected BS.

Then, the MS terminates the process according to an exemplary embodiment of the present invention.

When an HO drop occurs in a wireless communication system, a serving BS according to an exemplary embodiment of the present invention may operate as in FIG. 6 below.

Figure 6:
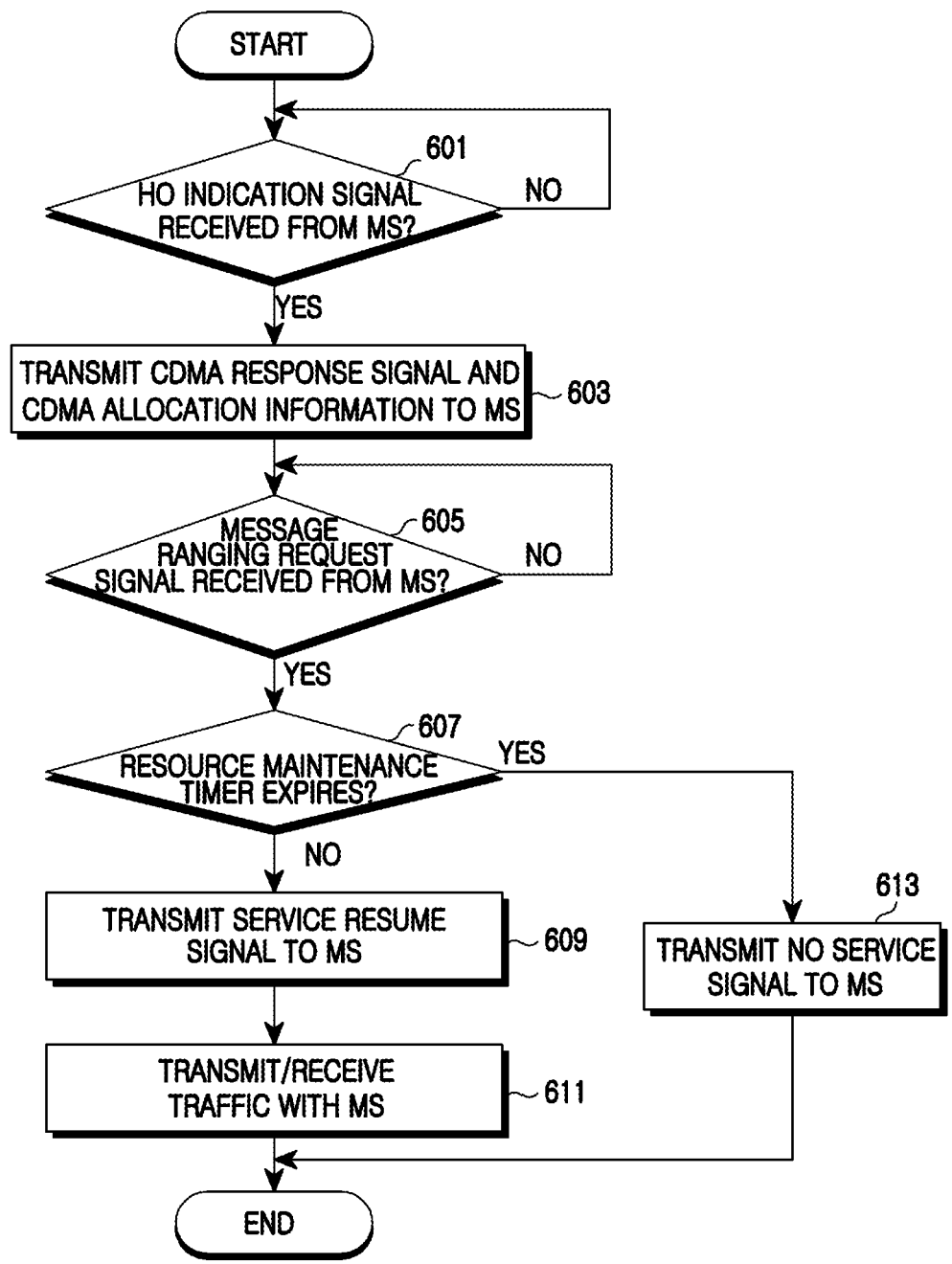
FIG. 6 is a flow diagram illustrating an operation process of a BS for processing an HO drop in a wireless communication system according to another exemplary embodiment of the present invention.

FIG. 6 is a flow diagram illustrating an operation process of a BS for processing an HO drop in a wireless communication system according to another exemplary embodiment of the present invention.

Referring to FIG. 6, in step 601, the BS determines if it receives a CDMA code for handover from an MS, which has previously been provided with a service before performing handover to a target BS.

If the CDMA code for handover is received, the BS transmits a response signal to the CDMA code and CDMA allocation IE (CDMA-Alloc IE) information to the MS in step 603. The response signal to the CDMA code represents a code ranging response signal (RNG-RSP) that may include information on a timing offset, a frequency offset and the like depending on an uplink basis of the BS. The CDMA allocation IE information may include ranging code attribute information of a CDMA code index received by the BS, a frame number where a CDMA code is received, a position of an OFDM time symbol where the received CDMA code is located, OFDMA subchannel index information having a modulation of the CDMA code, etc., and uplink resource allocation information.

In step 605, the BS determines if it receives a message ranging request signal from the MS. That is, the BS identifies if it receives a message ranging request signal in which a serving BSID TLV is the same as its own BSID.

If the message ranging request signal, in which the serving BSID TLV is the same as its own BSID, is received, the BS identifies if a resource maintenance timer for releasing information on an MS performing the code ranging and message ranging expires in step 607. In an exemplary implementation, the resource maintenance timer is driven to release information on the MS if an HO indication signal for performing handover to a target BS is received from an MS as in step 239 of FIG. 2.

If the resource maintenance timer does not expire, in step 609 the BS determines that it can perform communication with the MS based on information for performing communication with the MS. Thus, the BS transmits a service resume signal to the MS. That is, the BS sets a ranging status value of a response signal to the message ranging request signal constructed as in Table 4 to '3' and transmits the response signal to the MS. The response signal may include a MAC protocol parameter allocated to the MS in the serving BS. For instance, the MAC protocol parameter may include a basic CID, a primary CID, a traffic CID, authentication information and the like.

Then, in step 611 the BS transmits/receives traffic with the MS.

If it is determined that the resource maintenance timer expires in step 607, the BS determines that it cannot perform communication with the MS because it has deleted information for performing communication with the MS. Thus, the BS transmits a no service signal to the MS in step 613. That is, the BS sets a ranging status value of a response signal to the message ranging request signal constructed as in Table 4 to '4' and transmits the response signal to the MS.

Then, the BS terminates the process according to an exemplary embodiment of the present invention.

Constructions of an exemplary MS and BS for consistency of a communication state between the MS and the BS upon occurrence of an HO drop in the wireless communication system are described below.

Figure 7:
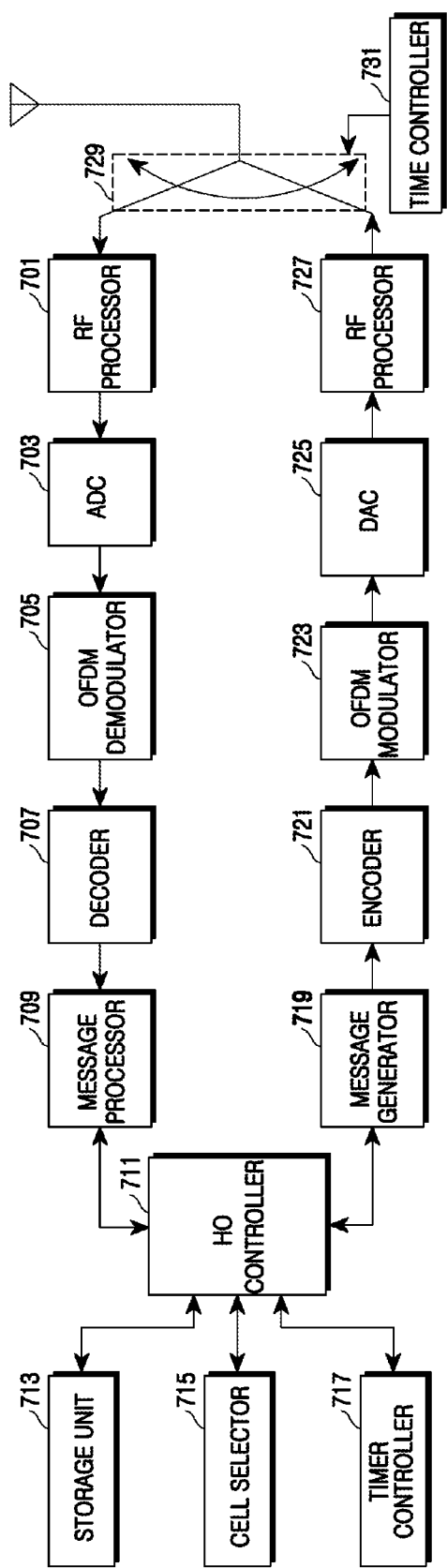
FIG. 7 is a block diagram illustrating a construction of an MS in a wireless communication system according to an exemplary embodiment of the present invention.

FIG. 7 is a block diagram illustrating a construction of an MS in a wireless communication system according to an exemplary embodiment of the present invention.

Referring to FIG. 7, the MS may include Radio Frequency (RF) processors 701 and 727, an Analog-to-Digital Converter (ADC) 703, an Orthogonal Frequency Division Multiple (OFDM) demodulator 705, a decoder 707, a message processor 709, a handover controller 711, a storage unit 713, a cell selector 715, a timer controller 717, a message generator 719, an encoder 721, an OFDM modulator 723, a Digital-to-Analog Converter (DAC) 725, a switch 729, and a time controller 731.

The time controller 731 controls a switching operation of the switch 729 on the basis of frame synchronization. For instance, in a signal reception mode, the time controller 731 controls the switch 729 to connect an antenna with the RF processor 701 of a receiving end. In a signal transmission mode, the time controller 731 controls the switch 729 to connect the antenna with the RF processor 727 of a transmitting end.

In a signal reception mode, the RF processor 701 converts an RF signal received through the antenna into a baseband analog signal. The ADC 703 converts an analog signal received from the RF processor 701 into sample data. The OFDM demodulator 705 processes sample data received from the ADC 703 by Fast Fourier Transform (FFT) and converts the sample data into frequency domain data.

The decoder 707 selects data of subcarriers intended for actual reception among frequency domain data received from the OFDM demodulator 705. After that, the decoder 707 demodulates and decodes the selected data according to a modulation level (i.e., a Modulation and Coding Scheme (MCS) level).

The message processor 709 identifies control information in a control message received from the decoder 707 and provides the control information to the handover controller 711. That is, the message processor 709 processes a control message received from a serving BS and a target BS for handover of the MS. For instance, the message processor 709 identifies information on neighboring BSs supporting handover of the MS in an HO response signal received from the serving BS to perform handover, and provides the identified information to the handover controller 711. Also, the message processor 709 processes a signal received from a target BS for handover ranging performed for HO entry and provides its result to the handover controller 711.

If an HO drop occurs and the MS operates as in FIG. 3, the message processor 709 identifies information regarding the returning of service to the serving BS in a response signal, constructed as in Table 2, received from the serving BS in response to an HO indication signal.

If an HO drop occurs and the MS operates as in FIG. 5, the message processor 709 processes a signal for HO ranging with the serving BS. At this time, the message processor 709 identifies information regarding the returning of service to the serving BS in a response signal, constructed as in Table 4, received from the serving BS in response to a message ranging request signal.

The handover controller 711 controls handover of the MS using information received from the message processor 709. For example, the handover controller 711 controls an HO ranging process with the target BS. At this time, the handover controller 711 controls and deletes information for communicating with the serving BS from the storage unit 713 depending on a control signal received from the timer controller 717.

If an HO drop occurs, the handover controller 711 controls and hands over to a BS selected by the cell selector 715. If the BS selected by the cell selector 715 is the serving BS, the handover controller 711 controls the MS to return for service to the serving BS. At this time, the handover controller 711 controls such that the MS and serving BS are in the same communication state. For example, when the handover controller 711 operates as shown in FIG. 5, the handover controller 711 controls and performs ranging for service back to the serving BS. Then, the handover controller 711 determines if the ranging response signal is received from the serving BS within a threshold time and determines if service returns or not to the serving BS. If a ranging response signal is not received from the serving BS within the threshold time, the handover controller 711 controls and performs MAC re-initialize to the serving BS.

The storage unit 713 stores information for communicating with the serving BS and, if a resource maintenance timer expires under control of the handover controller 711, deletes information for communicating with the serving BS. The information on the serving BS may include a frequency of the serving BS, a preamble index, a serving BS ID, service related context information and the like.

The cell selector 715 selects a BS to perform handover using channel information of neighboring BSs received from the handover controller 711.

If the handover controller 711 transmits to the serving BS an HO indication signal for performing handover to a target BS, the timer controller 717 drives a resource maintenance timer for releasing information for communicating with the serving BS. Thereafter, when the resource maintenance timer expires, the timer controller 717 transmits expiration information on the resource maintenance timer to the handover controller 711.

The message generator 719 generates a message using various kinds of information received from the handover controller 711 and outputs the generated message to the encoder 721 of a physical layer. That is, the message generator 719 generates a message for handover to a target BS under control of the handover controller 711. For example, when an HO drop occurs and the MS returns to the serving BS, the message generator 719 generates an HO indication message for returning to the serving BS. At this time, the message generator 719 sets a signal type of the HO indication message as '0b11' to represent that the HO indication message is a signal for returning to the serving BS.

In another exemplary embodiment, when an HO drop occurs and the MS returns to the serving BS, the message generator 719 generates a message for performing HO ranging to the serving BS. That is, the message generator 719 generates a CDMA code for handover and generates a request signal for message ranging. At this time, the message generator 719 sets a BSID of a serving BSID TLV of the request signal as a BSID of the serving BS to represent that the request signal is a signal for returning to the serving BS.

The encoder 721 encodes and modulates a message received from the message generator 719 according to a modulation level (i.e., an MCS level). The OFDM modulator 723 processes a message received from the encoder 721 by Inverse Fast Fourier Transform (IFFT) and converts the message into sample data (i.e., an OFDM symbol). The DAC 725 converts the sample data received from the OFDM modulator 723 into an analog signal. The RF processor 727 converts an analog signal received from the DAC 725 into an RF signal and transmits the RF signal through the antenna.

In the aforementioned construction, the handover controller 711, which is a protocol controller, controls the message processor 709, the message generator 719, the cell selector 715, and the timer controller 717. That is, although they are separately constructed and shown in order to distinguish and describe respective functions in the present invention, the handover controller 711 can perform functions of the message processor 709, the message generator 719, the cell selector 715, and the timer controller 717. Thus, when a product is actually realized, the product can be constructed so that the handover controller 711 can process all of the functions. Alternately, the product can be constructed so that the handover controller 711 can process only part of them.

Figure 8:
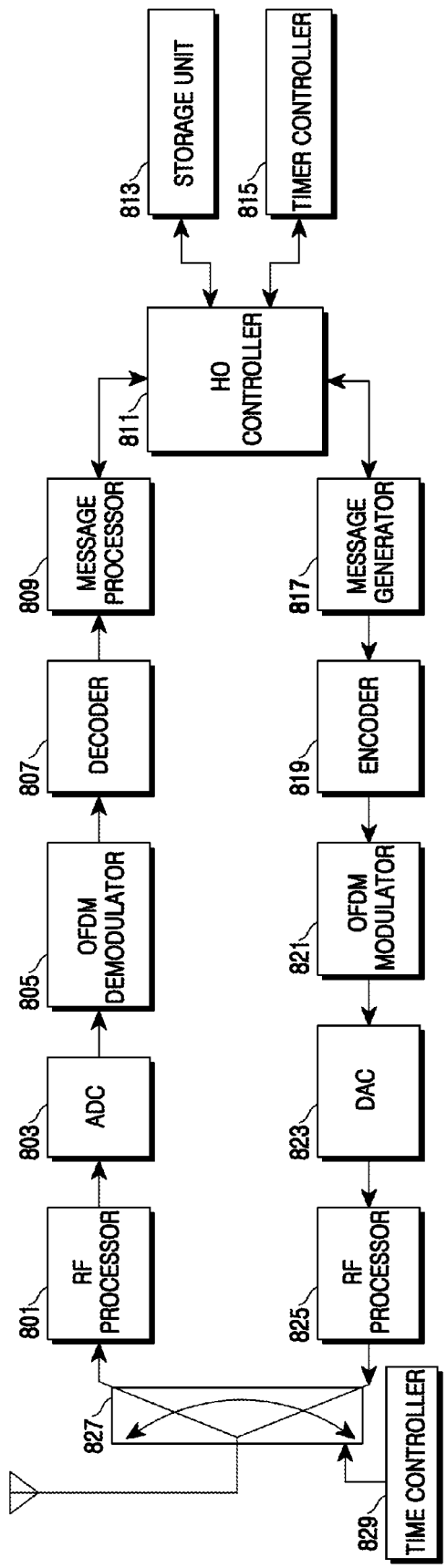
FIG. 8 is a block diagram illustrating a construction of a BS in a wireless communication system according to an exemplary embodiment of the present invention.

FIG. 8 is a block diagram illustrating a construction of a BS in a wireless communication system according to an exemplary embodiment of the present invention.

Referring to FIG. 8, the BS may include RF processors 801 and 825, an ADC 803, an OFDM demodulator 805, a decoder 807, a message processor 809, a handover controller 811, a storage unit 813, a timer controller 815, a message generator 817, an encoder 819, an OFDM modulator 821, a DAC 823, a switch 827, and a time controller 829.

The time controller 829 controls a switching operation of the switch 827 on the basis of frame synchronization. For instance, in a signal reception mode, the time controller 829 controls the switch 827 to connect an antenna with the RF processor 801 of a receiving end. In a signal transmission mode, the time controller 829 controls the switch 827 to connect the antenna with the RF processor 825 of a transmitting end.

In a signal reception mode, the RF processor 801 converts an RF signal received through the antenna into a baseband analog signal. The ADC 803 converts an analog signal received from the RF processor 801 into sample data. The OFDM demodulator 805 processes sample data received from the ADC 803 by Fast Fourier Transform (FFT) and converts the sample data into frequency domain data.

The decoder 807 selects data of subcarriers intended for actual reception among frequency domain data received from the OFDM demodulator 805. After that, the decoder 807 demodulates and decodes the selected data according to a modulation level (i.e., an MCS level).

The message processor 809 analyzes a control message received from the decoder 807 and provides its result to the handover controller 811. That is, the message processor 809 processes a control message received for handover of an MS. For example, the message processor 809 acquires information on neighboring BSs from an HO request signal received from the MS and provides the information to the handover controller 811.

If an HO indication signal constructed as in Table 1 is received from an MS, the message processor 809 determines a signal type of the HO indication signal, thus determining if the MS sends an HO indication to a target BS or desires to go back for service to the BS.

If a message ranging request signal including a serving BSID TLV constructed as in Table 3 is received from the MS, the message processor 809 determines if the MS performs handover to a target BS or desires to go back for service to its own serving BS through a BSID of the serving BSID TLV.

The handover controller 811 controls handover of MSs through information received from the message processor 809. For example, if an HO indication signal for handover to a target BS is received from an MS in service, the handover controller 811 controls the timer controller 815, driving a resource maintenance timer for releasing information for communicating with the MS. Then, if a resource maintenance timer expiration signal is received from the timer controller 815, the handover controller 811 controls and deletes information for communicating with the MS from the storage unit 813.

When an MS located in a service area requests to return to the serving BS due to occurrence of a drop in the course of performing handover to a different BS, the handover controller 811 controls and transmits a response signal to the MS to keep a communication state with the MS identical. For example, when the MS requests for service back using an HO indication signal constructed as in Table 1, the handover controller 811 controls and informs the MS of service back or not using a response signal constructed as in Table 2.

When the MS requests to reestablish service using a message ranging request signal including a serving BSID TLV constructed as in Table 3, the handover controller 811 controls and informs the MS of returning service using a response signal constructed as in Table 4.

The storage unit 813 stores information for communicating with an MS located in a service area and, if a resource maintenance timer expires, deletes the information for communicating with the MS under control of the handover controller 811.

If an HO indication signal for performing handover to a different BS is received from the MS under control of the handover controller 811, the timer controller 815 drives a resource maintenance timer for releasing information for communicating with the MS. After that, when the resource maintenance timer expires, the timer controller 815 transmits expiration information on the resource maintenance timer to the handover controller 811.

The message generator 817 generates a message using various kinds of information received from the handover controller 811 and outputs the generated message to the encoder 821 of a physical layer. That is, the message generator 817 generates a message for controlling handover of an MS located in a service area under control of the handover controller 811. For example, when an HO drop occurs and an MS requests for returning service using an HO indication signal constructed as in Table 1, the message generator 817 generates a response signal constructed as in Table 2.

When the MS requests for returning service using a message ranging request signal including a serving BSID TLV constructed as in Table 3, the message generator 817 generates a response signal constructed as in Table 4.

The encoder 819 encodes and modulates a message received from the message generator 817 according to an MCS level. The OFDM modulator 821 processes the message received from the encoder 819 by IFFT and converts the processed message into sample data (i.e., an OFDM symbol). The DAC 823 converts the sample data received from the OFDM modulator 821 into an analog signal. The RF processor 825 converts the analog signal received from the DAC 823 into an RF signal and transmits the RF signal through an antenna.

In the aforementioned construction, the handover controller 811, which is a protocol controller, controls the message processor 809, the message generator 817, and the timer controller 815. That is, the handover controller 811 can perform functions of the message processor 809, the message generator 817, and the timer controller 815. These are separately constructed and shown in order to distinguish and describe respective functions in exemplary embodiments of the present invention. Thus, when a product is actually realized, the product can be constructed so that the handover controller 811 can process all of the functions. Alternately, the product can be constructed so that the handover controller 811 can process only part of them.

As described above, exemplary embodiments of the present invention have an advantage of, when an MS returns for service to a former serving BS due to occurrence of an HO drop in a wireless communication system, making communication states of the serving BS and the MS consistent identically, thereby being capable of minimizing a packet transmission/reception service interruption time of the MS and preventing the danger that different MSs use the same CID at the same time in the serving BS because of inconsistency of the communication states of the serving BS and MS. Also, exemplary embodiments of the present invention have an advantage of, when handover to a different target BS is performed due to occurrence of an HO drop, HO entry is performed using information for communicating with an MS stored in a former serving BS providing a service, thereby being capable of minimizing a packet interruption time caused by handover.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a mobile station (MS) in a wireless communication system, the method comprising:
   transmitting, by the MS, a request message for a re-establishment to a first base station (BS) if a handover failure occurs during a handover from the first BS to a second BS;
   receiving a response message from the first BS, the response message being transmitted by the first BS after the first BS receives the request message for the re-establishment to the first BS transmitted by the MS;
   performing a communication with the first BS without a re-entry procedure if the response message indicates that the re-establishment is available; and
   performing the re-entry procedure with the first BS, if the response message indicates that the re-establishment is not available,
   wherein the request message includes a re-establishment cause indicating that the MS requests the re-establishment due to the handover failure.

2. The method of claim 1, wherein the request message comprises a first BS ID type/length/value (TLV) field value set to a first BS ID to represent that it is a signal for resuming service with the first BS.

3. The method of claim 1, further comprising:
   selecting a target BS after determining the handover failure;
   if the target BS comprises another BS other than the first BS, identifying if information for communicating with the first BS is stored; and
   if the information is stored, performing handover (HO) entry to the other BS.

4. The method of claim 3, further comprising, if the information is not stored, performing a re-initialization with the other BS.

5. The method of claim 1, further comprising:
   selecting a target BS after determining the handover failure; and
   determining whether the target BS and the first BS are identical.

6. The method of claim 1, wherein the transmitting of the request message for the re-establishment comprises:
   determining whether a resource maintenance timer has expired; and
   if the resource maintenance timer has not expired, transmitting the request message.

7. The method of claim 6,
   wherein the resource maintenance timer indicates whether information for communicating with the first BS is stored, and
   wherein the information comprises at least one of a frequency of the first BS, a preamble index, a first BS identifier (ID), and a service related context information of the first BS.

8. The method of claim 6, further comprising, if the resource maintenance timer has expired, performing the re-entry procedure with the first BS.

9. The method of claim 6, further comprising, if the response signal is not received within a threshold time, determining whether the resource maintenance timer has expired.

10. An apparatus for a mobile station (MS) in a wireless communication system, comprising:
    a transmitter configured to transmit, from the MS, a request message for a re-establishment to a first base station (BS), if a handover failure occurs during a handover from the first BS to a second BS;
    a receiver configured to receive a response message from the first BS, the response message being transmitted by the first BS after the first BS receives the request message for the re-establishment to the first BS transmitted by the MS; and
    a controller configured to:
        perform a communication with the first BS without a re-entry procedure if the response message indicates that the re-establishment is available, and
        perform the re-entry procedure with the first BS if the response message indicates that the re-establishment is not available,
    wherein the request message includes a re-establishment cause indicating that the MS requests the re-establishment due to the handover failure.

11. The apparatus of claim 10, wherein the request message comprises a first BS ID type/length/value (TLV) field value set to a first BS ID to represent that it is a signal for resuming service with the first BS.

12. The apparatus of claim 10, wherein the controller is configured to select a target BS after determining the handover failure, and, to determine whether the target BS and the first BS are identical.

13. The apparatus of claim 10, wherein the controller is configured to:
- determine whether a resource maintenance timer has expired, and,
- if the resource maintenance timer has not expired, transmit the request message.

14. The apparatus of claim 13,
- wherein the resource maintenance timer indicates whether information for communicating with the first BS is stored, and
- wherein the information comprises at least one of a frequency of the first BS, a preamble index, a first BS identifier (ID), and a service related context information of the first BS.

15. The apparatus of claim 13, wherein the controller is configured to perform the re-entry procedure with the first BS, if the resource maintenance timer has expired or the response signal is not received within a threshold time.

16. The apparatus of claim 10,
- wherein the controller is configured to select a target BS after determining the handover failure,
- wherein, if the target BS comprises another BS other than the first BS, the controller is configured to identify if information for communicating with the first BS is stored, and
- wherein, if the information is stored, the controller is configured to perform handover entry to the another BS.

* * * * *